US008861642B2

United States Patent
Baik et al.

(10) Patent No.: US 8,861,642 B2
(45) Date of Patent: Oct. 14, 2014

(54) METHOD AND APPARATUS FOR MAPPING QUADRATURE AMPLITUDE MODULATION SYMBOL

(75) Inventors: Chang-hyun Baik, Suwon-si (KR); Hyun-jung Ko, Seoul (KR); Jun-yeub Lee, Seongnam-si (KR); Jun-seok Kang, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 13/616,506

(22) Filed: Sep. 14, 2012

(65) Prior Publication Data

US 2013/0121442 A1   May 16, 2013

(30) Foreign Application Priority Data

Nov. 11, 2011   (KR) .................. 10-2011-0117783

(51) Int. Cl.
  *H04L 27/36*   (2006.01)
  *H04L 27/26*   (2006.01)
  *H04L 1/00*    (2006.01)

(52) U.S. Cl.
  CPC ............ *H04L 27/36* (2013.01); *H04L 27/2601* (2013.01); *H04L 1/0086* (2013.01)
  USPC ................... 375/298; 375/261; 714/746

(58) Field of Classification Search
  USPC .......... 375/224, 261, 268, 298, 300; 370/206; 714/746, 752, 786; 332/103, 149
  See application file for complete search history.

(56) References Cited

U.S. PATENT DOCUMENTS

| 2004/0192218 A1* | 9/2004 | Oprea .............................. 455/73 |
| 2007/0192086 A1* | 8/2007 | Guo et al. .................. 704/200.1 |
| 2012/0288024 A1* | 11/2012 | Hansen et al. ................ 375/267 |

* cited by examiner

*Primary Examiner* — Jean B Corrielus
(74) *Attorney, Agent, or Firm* — Sughrue Mion, PLLC

(57) ABSTRACT

A method and an apparatus for mapping a quadrature amplitude modulation (QAM) symbol. The QAM symbol mapping apparatus includes a frequency checker, which checks frequencies of sub-carriers in an orthogonal frequency division multiplexing (OFDM) symbol; and a data categorizer, which maps data coded for error correction and uncoded data to the sub-carriers based on the checked frequencies, wherein the data categorizer maps a combination of the coded data and the uncoded data with respect to sub-carriers having frequencies lower than a reference frequency.

25 Claims, 9 Drawing Sheets

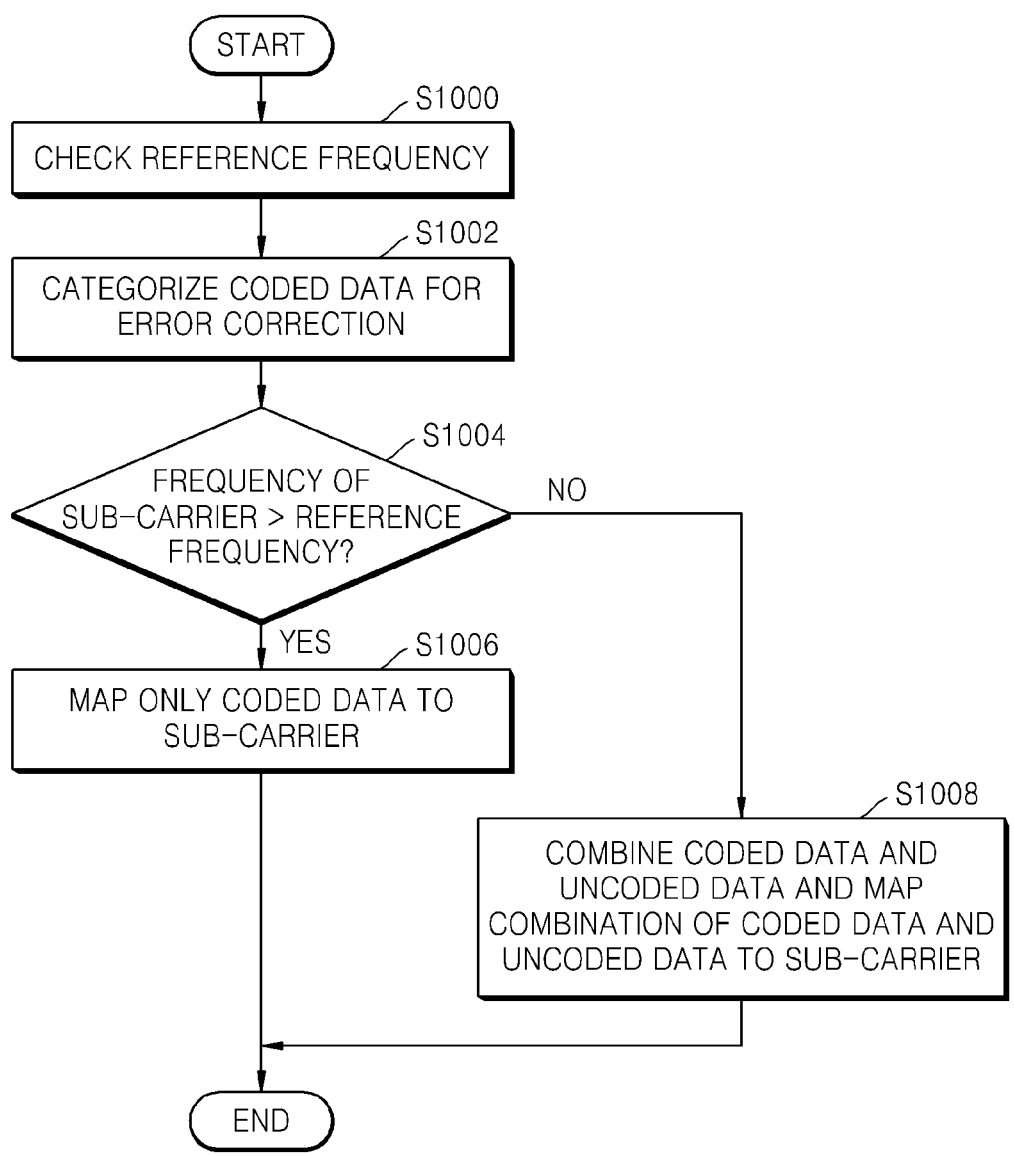

METHOD AND APPARATUS FOR MAPPING QUADRATURE AMPLITUDE MODULATION SYMBOL

CROSS-REFERENCE TO RELATED PATENT APPLICATION

This application claims priority from Korean Patent Application No. 10-2011-0117783, filed on Nov. 11, 2011, in the Korean Intellectual Property Office, the disclosure of which is incorporated herein in its entirety by reference.

BACKGROUND

1. Field

Methods and apparatuses consistent with the exemplary embodiments relate to a method and an apparatus for mapping a quadrature amplitude modulation (QAM) symbol, and more particularly, to mapping a QAM symbol by categorizing and mapping data based on magnitudes of frequencies of carrier signals.

2. Description of the Related Art

Due to the developments in electronic and communication technologies, digital technologies have been introduced to broadcasting system industries, and various digital broadcasting formats are being suggested. From among these formats, a multi-carrier signal system employed by a digital video broadcast-terrestrial (DVB-T) format is an orthogonal frequency digital multiplexing (OFDM) system. The OFDM is a technology employed as the standards of IEEE 802.11a, ETSI BRAN'S HYPERLAN2, European digital TV broadcasting DAB, and DVB-T. In the related art single-carrier signal system for transmitting data via a single carrier signal, intense interference occurs between symbols, which increases distortion. Therefore, it is necessary to increase the complexity of an equalizer at the reception end. To resolve such problems of the single-carrier signal system, the OFDM system has been introduced.

The OFDM system is a system for transmitting data via multi-carrier signals by parallel-converting data symbols input in series, modulating each of the parallel-converted data symbols to a plurality of mutually orthogonal tone signals, and transmitting the tone signals.

Compared to the related art multi-carrier signal system, orthogonality is maintained between surrounding tone signals in the OFDM system. Therefore, optical transmission efficiency may be acquired during high-speed data transmission. Furthermore, the OFDM system features high efficiency of using frequency and is strong against multi-path fading.

In the OFDM system, OFDM symbols are transmitted in various transmission units, e.g., frames or super-frames. Each OFDM symbol includes a plurality of symbols. Each symbol may indicate at least one or more data bits.

Wired communication technology is generally used in the fields including telephone, cable TV, internet access, and optical communication. Compared to the past, high-quality image data and high volume data are increasing, and techniques for transmitting such data are being developed.

In a case where a common 128 QAM constellation is used in the related art 10 Gbase Ethernet, since distances between symbols are not uniform, only 128 symbols are arranged in a region used by 256 QAM constellation to unify and increase distances between symbols. As a result, only 50% of the region is actually used, and transmission efficiency is deteriorated.

Furthermore, in a case of wired communication, if high frequency signals are used for transmitting a large amount of data, signal reduction is significant.

SUMMARY

The exemplary embodiments provide a method and an apparatus for mapping a quadrature amplitude modulation (QAM) symbol for providing a large amount of data via a cable.

The exemplary embodiments also provide a method and an apparatus for mapping a quadrature amplitude modulation (QAM) symbol for transmitting combinations of data coded for error correction and uncoded data based on a frequency of a sub-carrier.

The exemplary embodiments also provide a method and an apparatus for mapping a quadrature amplitude modulation (QAM) symbol for distinctively mapping symbols in a constellation for transmitting combinations of data coded for error correction and uncoded data based on a frequency of a sub-carrier.

According to an aspect of the exemplary embodiments, there is provided a quadrature amplitude modulation (QAM) symbol mapping apparatus including a frequency checker, which checks frequencies of sub-carriers in an orthogonal frequency division multiplexing (OFDM) symbol; and a data categorizer, which maps data coded for error correction and uncoded data to the sub-carriers based on the checked frequencies, wherein the data categorizer maps the uncoded data with respect to sub-carriers having frequencies lower than a reference frequency.

The data categorizer may combine the coded data and the uncoded data and map the combination with respect to the sub-carriers having frequencies lower than the reference frequency.

The data categorizer may map only the coded data with respect to the sub-carriers having frequencies higher than the reference frequency.

The QAM symbol mapping apparatus may further include a mapper, which maps bit values to symbols included in a constellation corresponding to the sub-carriers, wherein the coded data and the uncoded data may be transmitted via the sub-carriers based on the bit values mapped to the symbols.

From among the bit values corresponding to the symbols in the constellation regarding the sub-carriers having frequencies lower than the reference frequency, the mapper may map upper bit values to the uncoded data and map lower bit values to the coded data.

In the constellation regarding the sub-carriers having frequencies lower than the reference frequency, upper bit values in bits corresponding to symbols may be gray coded with respect to each other and lower bit values in bits corresponding to symbols may be gray coded with respect to each other.

In the constellation regarding the sub-carriers having frequencies lower than the reference frequency, all the bit values corresponding to a symbol may be mapped via gray-coding.

The coding for error correction may be low density parity check (LDPC) coding.

The reference frequency may be determined based on the degrees of reduction of intensities of signals of sub-carriers in the OFDM symbol during transmission via the wired cable.

The reference frequency may be determined based on at least one of the length and type of the wired cable.

According to another aspect of the exemplary embodiments, there is provided a quadrature amplitude modulation (QAM) symbol mapping method including checking frequencies of sub-carriers in an orthogonal frequency division multiplexing (OFDM) symbol; and mapping data coded for error correction and uncoded data to the sub-carriers based on the checked frequencies, wherein, in the step of mapping data, if a frequency of the sub-carrier signal is lower than the reference frequency, bit values corresponding to the symbol are categorized into a plurality of bit values, and the data to be transmitted is mapped to the categorized bit values.

In the step of mapping data, if the frequency of the sub-carrier signal is lower than the reference frequency, coded data and uncoded data may be combined and mapped to the bit values corresponding to the symbol.

In the step of mapping data, if the frequency of the sub-carrier signal is lower than the reference frequency, upper bit values from among the bit values corresponding to the symbols may be mapped to data coded for error correction, and lower bit values from among the bit values corresponding to the symbols may be mapped to uncoded data.

In the step of mapping data, if the frequency of the sub-carrier signal is lower than the reference frequency, bit values corresponding to the symbol may be categorized into upper bit values and lower bit values.

The upper bit values and the lower bit values may be individually mapped in the constellation via gray coding.

The reference frequency may be determined based on the degrees of reduction of intensities of signals of sub-carriers in the OFDM symbol during transmission via the wired cable.

The reference frequency may be determined based on at least one of the length and type of the wired cable.

The coding for error correction may be low density parity check (LDPC) coding.

According to another aspect of the exemplary embodiments, there is provided a quadrature amplitude modulation (QAM) symbol mapping method including checking frequencies of sub-carriers in an orthogonal frequency division multiplexing (OFDM) symbol; and comparing the checked frequencies to a reference frequency; and mapping symbols in a constellation with respect to the sub-carriers based on a result of the comparison, wherein, in the step of mapping the symbols in the constellation, if a frequency of the sub-carrier signal is lower than the reference frequency, bit values corresponding to the symbol are categorized into a plurality of bit values, and the categorized bit values are individually mapped.

The bit value corresponding to the symbol may be categorized into upper bit values and lower bit values, the upper bit values may be gray coded with respect to each other, and the lower bit values may be gray coded with respect to each other.

The upper bit values may correspond to uncoded data, and the lower bit values may correspond to data coded for error correction.

In the step of mapping the symbols in the constellation, if a frequency of the sub-carrier signal is higher than the reference frequency, all the bit values corresponding to the symbol may be mapped to each other.

If a frequency of the sub-carrier signal is higher than the reference frequency, the mapped symbols may correspond to data coded for error correction.

BRIEF DESCRIPTION OF THE DRAWINGS

The above and other aspects will become more apparent by describing in detail exemplary embodiments thereof with reference to the attached drawings in which:

FIG. 10 is a flowchart showing a method of mapping data to carrier signals, according to an exemplary embodiment.

DETAILED DESCRIPTION OF THE EXEMPLARY EMBODIMENTS

The application will now be described more fully hereinafter with reference to the accompanying drawings, in which exemplary embodiments. The exemplary embodiments may, however, be embodied in many different forms and should not be construed as limited to the exemplary embodiments set forth herein; rather, these exemplary embodiments are provided so that this disclosure will be thorough and complete, and will fully convey the scope of the exemplary embodiments to those skilled in the art. Like numbers refer to like elements throughout.

It will be understood that when an element or layer is referred to as being "connected" to another element or layer, the element or layer can be "directly connected" to another element or layer or "electrically connected" across elements. Like numbers refer to like elements throughout. As used herein, the term "and/or" includes any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the application will be described in detail by explaining exemplary embodiments with reference to the attached drawings.

Figure 1:
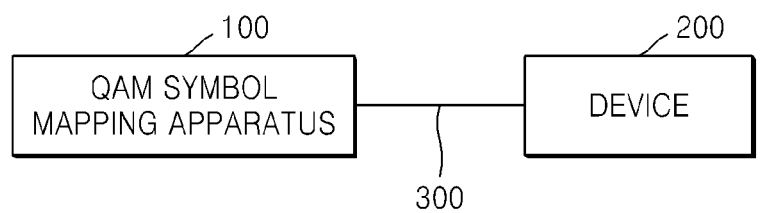
FIG. 1 is a diagram showing a system employing a quadrature amplitude modulation (QAM) symbol mapping apparatus according to an exemplary embodiment.

FIG. 1 is a diagram showing a system employing a quadrature amplitude modulation (QAM) symbol mapping apparatus 100 according to an exemplary embodiment.

As shown in FIG. 1, the QAM symbol mapping apparatus 100 according to the present exemplary embodiment is connected to a device 200 via a wired cable 300.

The QAM symbol mapping apparatus 100 may process data received from an external device (not shown) or generated by the QAM symbol mapping apparatus 100 and provide the processed data to the device 200 via modulated carrier signals. Furthermore, the modulated carrier signals may be transmitted to the device 200 via the wired cable 300, wherein an intensity of the modulated carrier signals may be reduced during transmission.

Furthermore, the QAM symbol mapping apparatus 100 may code a portion of the processed data such that the portion may be error-corrected, combine coded data and uncoded data, and transmit the combined data to the device 200 via a plurality of carrier signals.

Furthermore, the wired cable 300 may include category (CAT) 3, CAT 4, CAT 5, CAT 5E, CAT 6, CAT 6A, CAT 7, and CAT 7A cable. However, the exemplary embodiment is not limited thereto. Furthermore, according to an exemplary embodiment, data may be provided to the device 200 at a transmission rate of 25 Gbps or higher via the wired cable 300, which is 10 m or longer and has a Cat 7A or below. However, the exemplary embodiment is not limited thereto.

Furthermore, the device 200 includes a personal mobile terminal, a mobile phone, a TV, a server, and any of various other devices capable of receiving data from the QAM symbol mapping apparatus 100 via the wired cable 300.

Hereinafter, referring to FIG. 2, a detailed configuration of the QAM symbol mapping apparatus 100 according to the present exemplary embodiment will now be described.

Figure 2:
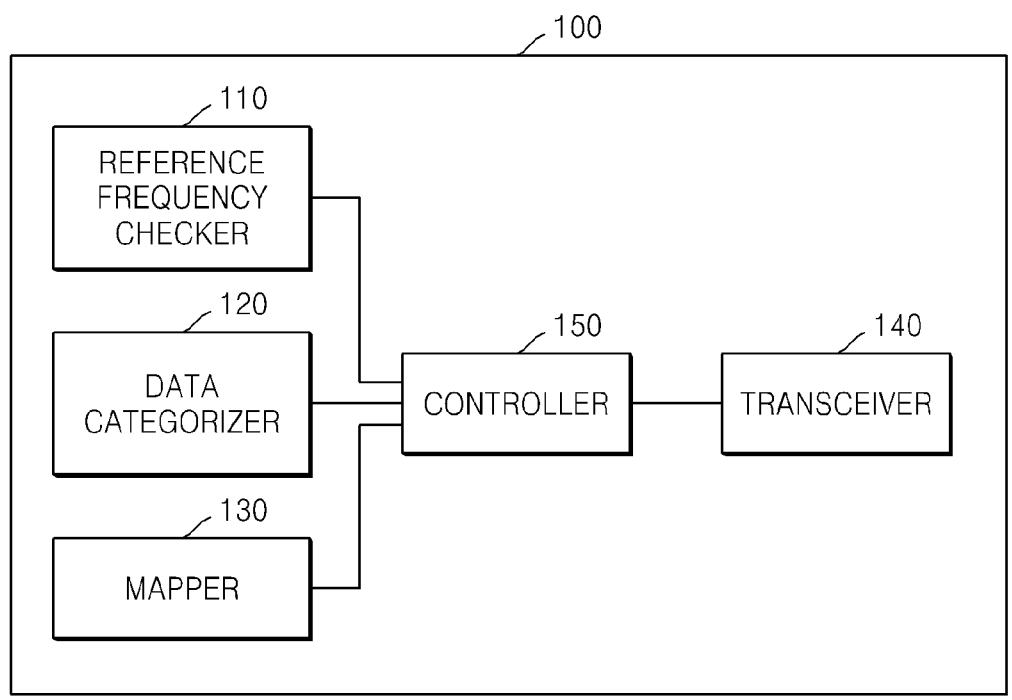
FIG. 2 is a diagram showing a detailed configuration of the QAM symbol mapping apparatus according to an exemplary embodiment.

FIG. 2 is a diagram showing a detailed configuration of the QAM symbol mapping apparatus 100 according to an exemplary embodiment.

As shown in FIG. 2, the QAM symbol mapping apparatus 100 according to the present exemplary embodiment includes a reference frequency checker 110, a data categorizer 120, a mapper 130, a transceiver 140, and a controller 150.

The reference frequency checker 110 determines whether a frequency of a carrier signal is higher than a reference frequency. The reference frequency checker 110 may determine whether a frequency of a sub-carrier in an OFDM symbol is higher than the reference frequency.

The reference frequency may be determined based on the degrees of reduction of intensities of signals of sub-carriers in an OFDM symbol during transmission via the wired cable 300. Furthermore, the reference frequency may be determined based on at least one of the length and type of the wired cable 300. The reduction of intensities of signals of sub-carriers in an OFDM symbol during transmission via the wired cable 300 will be described below in detail with reference to FIG. 4.

The data categorizer 120 categorizes data to be transmitted to the device 200 into data coded for error correction and uncoded data. Data to be transmitted from the QAM symbol mapping apparatus 100 to the device 200 may be partially or entirely coded for error correction, and data coded for error correction may be low density parity check (LDPC) coded data, for example.

Furthermore, before data is LDPC coded, the data may be processed by inserting control bits, inserting various headers, and scrambling. However, the exemplary embodiment is not limited thereto.

Furthermore, the data categorizer 120 maps categorized data to sub-carrier signals in an OFDM symbol. If a frequency of a sub-carrier in an OFDM symbol is lower than the reference frequency, the data categorizer 120 may combine coded data and uncoded data and map the combined data to the sub-carrier. Furthermore, if a frequency of a sub-carrier in an OFDM symbol is higher than the reference frequency, the data categorizer 120 may map only coded data to the sub-carrier. Therefore, based on magnitudes of frequencies of the plurality of sub-carriers, the plurality of sub-carriers in the OFDM symbol may be modulated with a combination of coded data and uncoded data or only with coded data.

The mapper 130 maps bit values to symbols included in a constellation corresponding to the sub-carrier. If the QAM symbol mapping apparatus 100 transmits data in the OFDM system, a plurality of sub-carriers may be included in an OFDM symbol, and the mapper 130 may perform QAM mapping on the sub-carriers according to respective frequencies.

The mapper 130 may categorize bit values corresponding to symbols into a plurality of groups in a constellation regarding a sub-carrier of which a frequency is lower than the reference frequency and may individually map the categorized bit values. The mapper 130 may separately map upper bit values and lower bit values from among bit values corresponding to each of the symbols in a constellation regarding a sub-carrier. For example, if 8-bit values correspond to each of the symbols in a constellation, the mapper 130 may map upper 4-bit values to each other and map lower 4-bit values to each other. In this case, the mapper 130 may map the upper 4-bit values to each other via gray coding and may map the lower 4-bit values to each other via gray coding.

Furthermore, the mapper 130 may map the mapped upper 4-bit values to uncoded data and map the mapped lower 4-bit values to coded data. A method by which the mapper 130 maps bit values with respect to a constellation regarding a sub-carrier having a frequency lower than the reference frequency will be described below in detail with reference to FIGS. 5 and 6.

Furthermore, the mapper 130 may map all the bit values corresponding to each of the symbols in a constellation regarding a sub-carrier having a frequency higher than the reference frequency without categorization. For example, if 8-bit values correspond to each of the symbols in a constellation, the mapper 130 may map the 8-bit values to each other via gray coding.

Furthermore, the mapper 130 may map the mapped 8-bit values to coded data. A method by which the mapper 130 maps bit values with respect to a constellation regarding a sub-carrier having a frequency higher than the reference frequency will be described below in detail with reference to FIGS. 7 and 8.

Here, a bit value mapped via gray coding may have only one bit different from another bit value corresponding to an adjacent symbol.

The transceiver 140 transmits and receives various information required for operating the QAM symbol mapping apparatus 100 to and from an external device.

The controller 150 controls the overall operation of the QAM symbol mapping apparatus 100 according to an exemplary embodiment to process data and provide the processed data to the device 200 via modulated carrier signals. Furthermore, the controller 150 controls the reference frequency checker 110, the data categorizer 120, the mapper 130, and the transceiver 140 according to frequencies of carrier signals for effectively combining data coded for error correction and uncoded data and transmitting the combined data to the device 200.

Hereinafter, referring to FIG. 3, an example in which the QAM symbol mapping apparatus 100 processes data will now be described.

Figure 3:
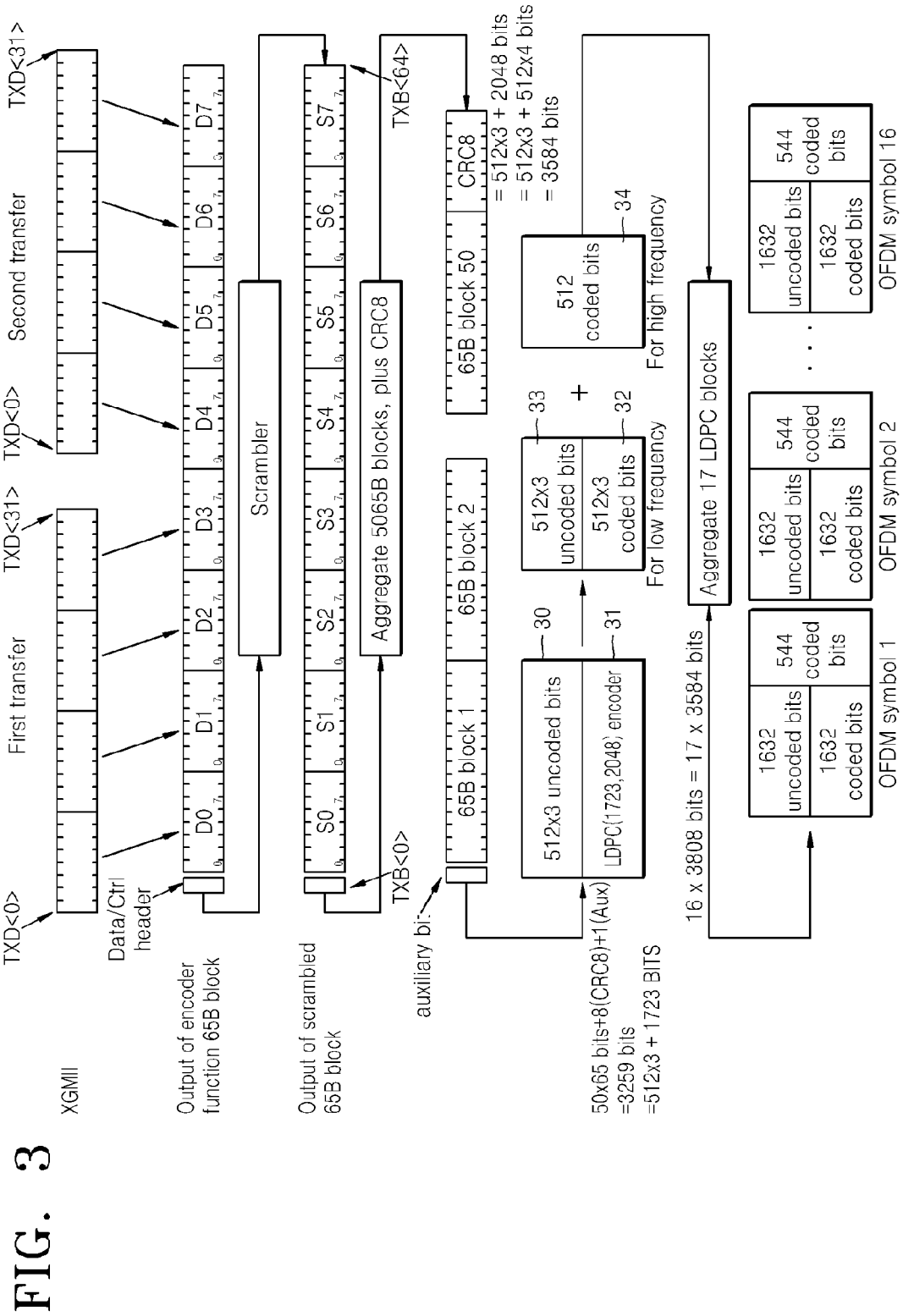
FIG. 3 is a diagram showing an example in which the QAM symbol mapping apparatus processes data according to an exemplary embodiment.

FIG. 3 is a diagram showing an example in which the QAM symbol mapping apparatus 100 according to an exemplary embodiment processes data.

As shown in FIG. 3, the QAM symbol mapping apparatus 100 may process data by inserting control bits, inserting various headers, and scrambling, wherein processed data handed from a physical coding sublayer (PCS) to a QAM mapper of a physical medium attachment may be partially LDPC coded for error correction.

Furthermore, as shown in FIG. 3, 2048 bits of data 31 may be coded for error correction and 1536 bits of data 30 may not be coded, and thus, a total of 3584 bits of data may constitute an OFDM symbol. Here, the QAM symbol mapping apparatus 100 may map a combination of the 1632 bits of coded data 32 and 1632 bits of uncoded data 33 to a low-frequency carrier signal in an OFDM symbol and may map only 544 bits of coded data 34 to a high-frequency carrier signal. As a result, a gain of data transmission may be increased and the efficiency and stability of data transmission may be improved.

Furthermore, as shown in Equation 1 below, the QAM symbol mapping apparatus 100 may map data collected via 17 OFDM symbols (17*3584 bits) to 16 OFDM symbols and may increase an amount of data allocated with respect to a single OFDM symbol to 3808 bits.

3808 bits/OFDM symbol=(4 uncoded bits+4 coded bits)*408 sub_carriers+8 coded bits*68 sub carriers  <Equation 1>

Hereinafter, referring to FIG. 4, the degrees of reduction of intensities of carrier signals during transmission via a cable will now be described.

Figure 4:
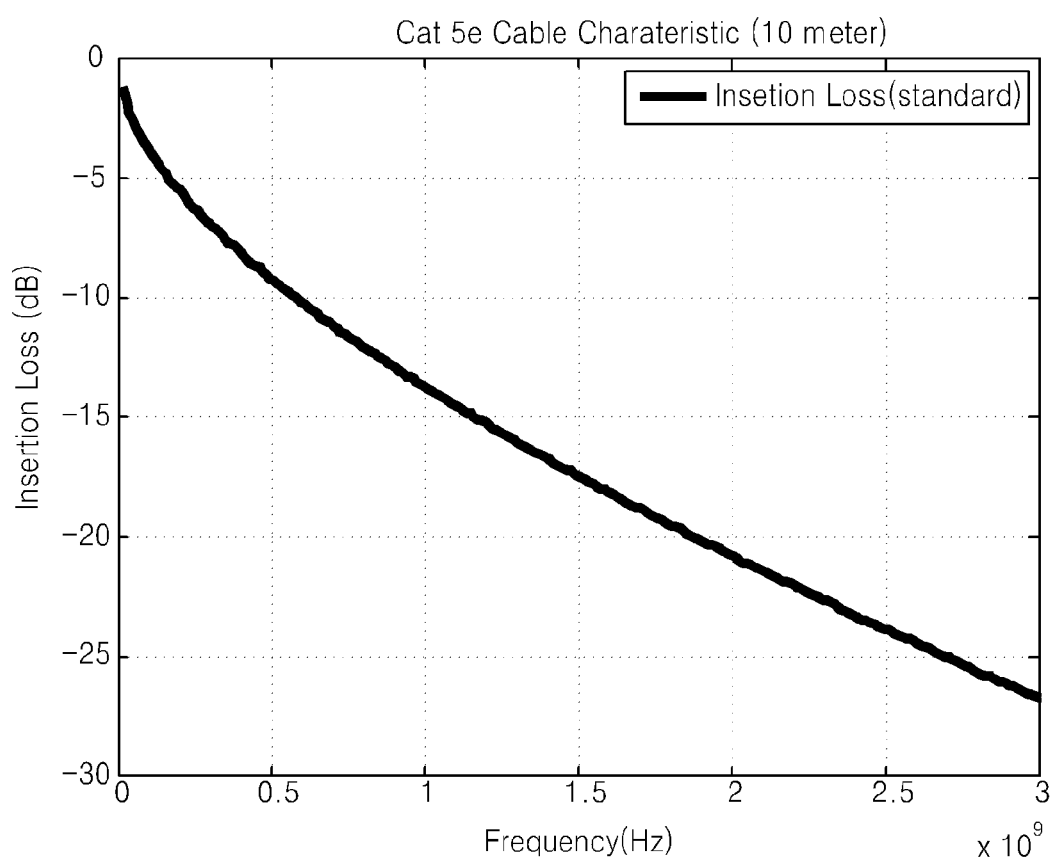
FIG. 4 is a diagram showing an example of the degrees of reduction of intensities of carrier signals during transmission via a cable.

FIG. 4 is a diagram showing an example of the degrees of reduction of intensities of carrier signals during transmission via a cable.

As shown in FIG. 4, in a case where a carrier signal according to an exemplary embodiment is transmitted via a 10 m Cat 5E cable, for example, the higher the frequency of the carrier signal is, the more significant the intensity of the carrier signal may decrease. The QAM symbol mapping apparatus 100 according to an exemplary embodiment may transmit error-correction coded data in a frequency domain with greater signal reduction and may transmit error-correction coded data and uncoded data together in a frequency domain with smaller signal reduction. Furthermore, the reference frequency may be determined based on the degrees of reduction of intensities of carrier signals. Furthermore, the reference frequency may be determined based on at least one of the length and type of the wired cable 300.

Hereinafter, referring to FIG. 5, a method by which the mapper 130 according to an exemplary embodiment maps bit values in a constellation corresponding to low-frequency carrier signals will now be described.

Figure 5:
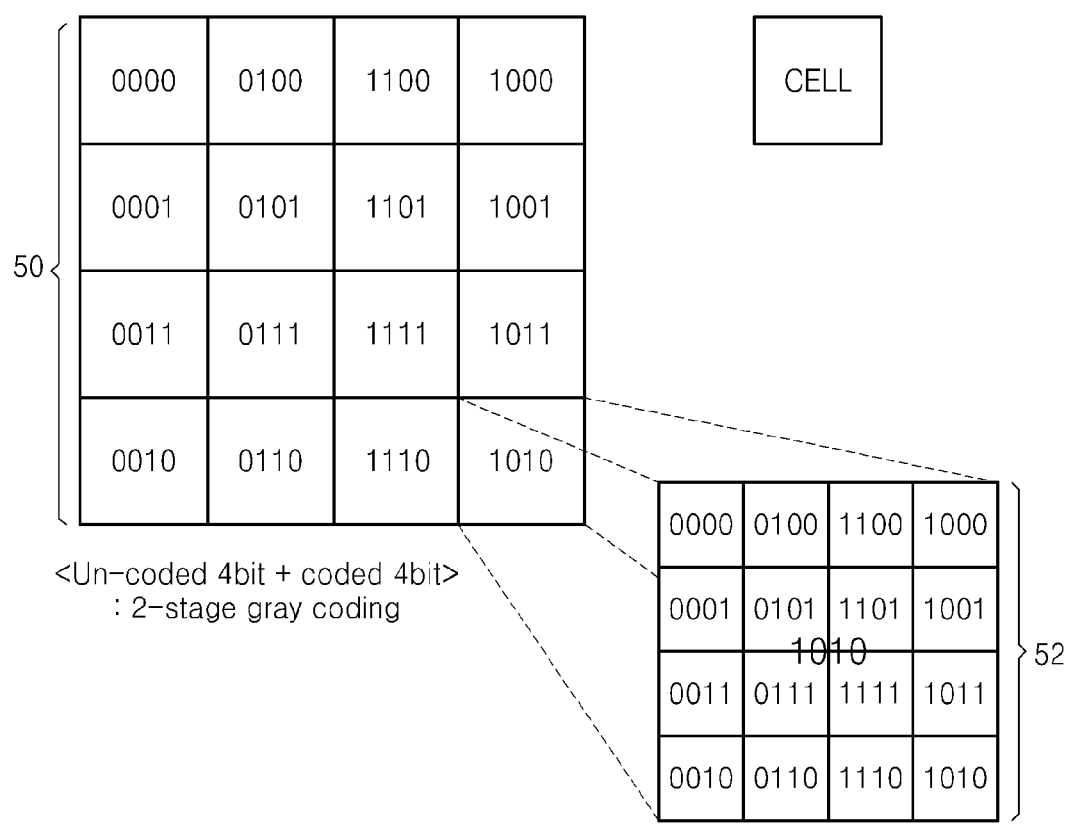
FIG. 5 is a diagram showing a method by which a mapper 130 maps bit values in a constellation corresponding to low-frequency carrier signals according to an exemplary embodiment.

FIG. 5 is a diagram showing a method by which the mapper 130 according to an exemplary embodiment maps bit values in a constellation corresponding to low-frequency carrier signals.

As shown in FIG. 5, the mapper 130 may categorize bit values corresponding to each of the symbols in a constellation corresponding to low-frequency carrier signals into upper bit values and lower bit values, and map the categorized bit values. In other words, from among bit values corresponding to each of the symbols in a constellation, upper bit values and lower bit values may be individually mapped via gray coding. For example, if 8-bit values correspond to each of the symbols in a constellation, the mapper 130 may map upper 4-bit values to each other (indicated by the reference numeral 50) via gray coding and map lower 4-bit values to each other (indicated by the reference numeral 52) via gray coding.

Furthermore, mapper 130 may map the mapped upper 4-bit values to uncoded data and map the mapped lower 4-bit values to coded data. However, the exemplary embodiment is not limited thereto. As a result, data transmitted via a carrier signal may be highly resistant against noise.

Figure 6:
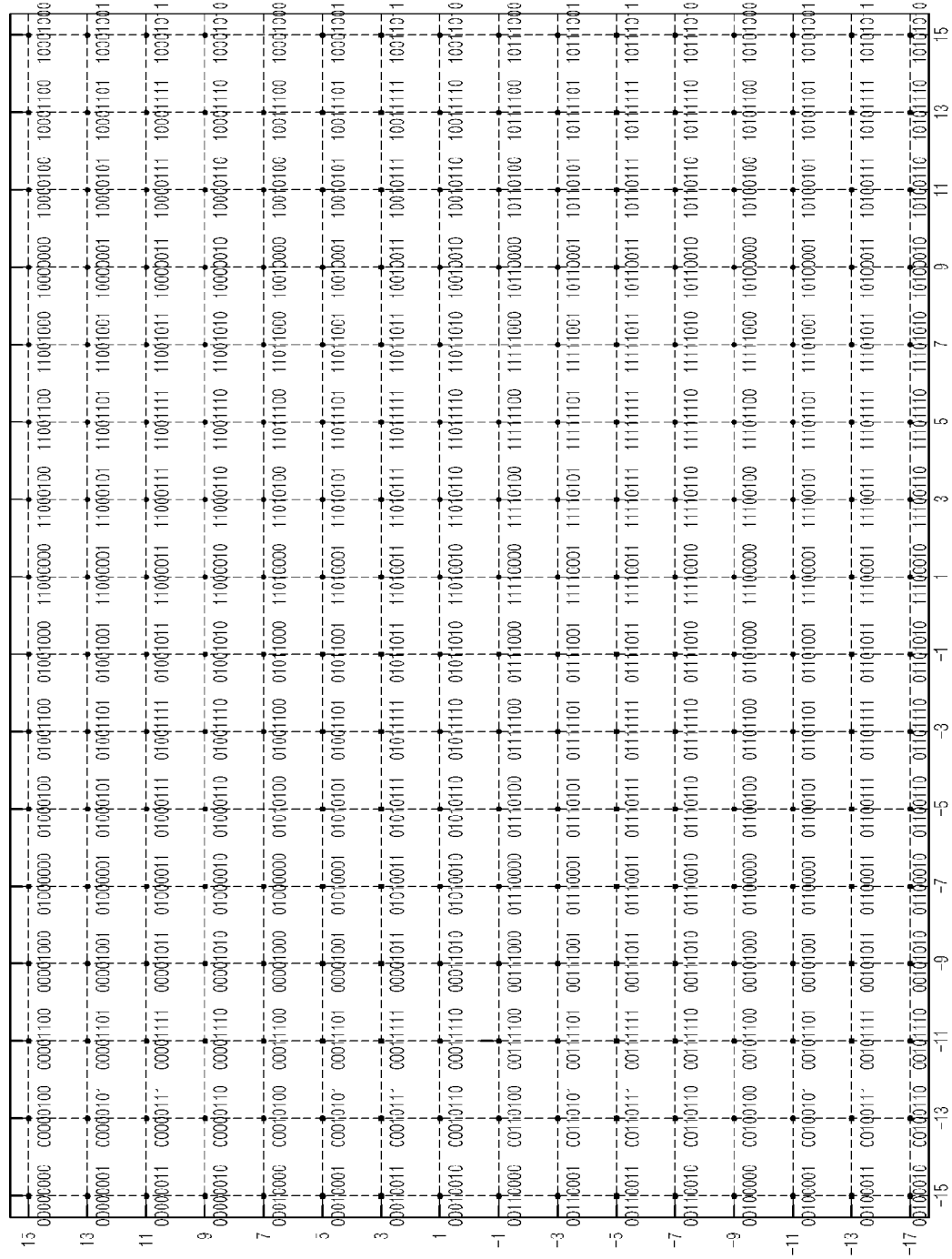
FIG. 6 is a diagram showing a constellation mapped using the method shown in FIG. 5.

Furthermore, FIG. 6 is a diagram showing a constellation mapped using the method shown in FIG. 5. As shown in FIG. 6, in a constellation corresponding to low-frequency carrier signals, upper 4-bit values corresponding to a symbol may have only one bit different from upper 4-bit values corresponding to an adjacent symbol. Furthermore, lower 4-bit values corresponding to a symbol may have only one bit different from lower 4-bit values corresponding to an adjacent symbol.

Hereinafter, referring to FIG. 7, a method by which the mapper 130 according to an exemplary embodiment maps bit values in a constellation corresponding to high-frequency carrier signals will now be described.

Figure 7:
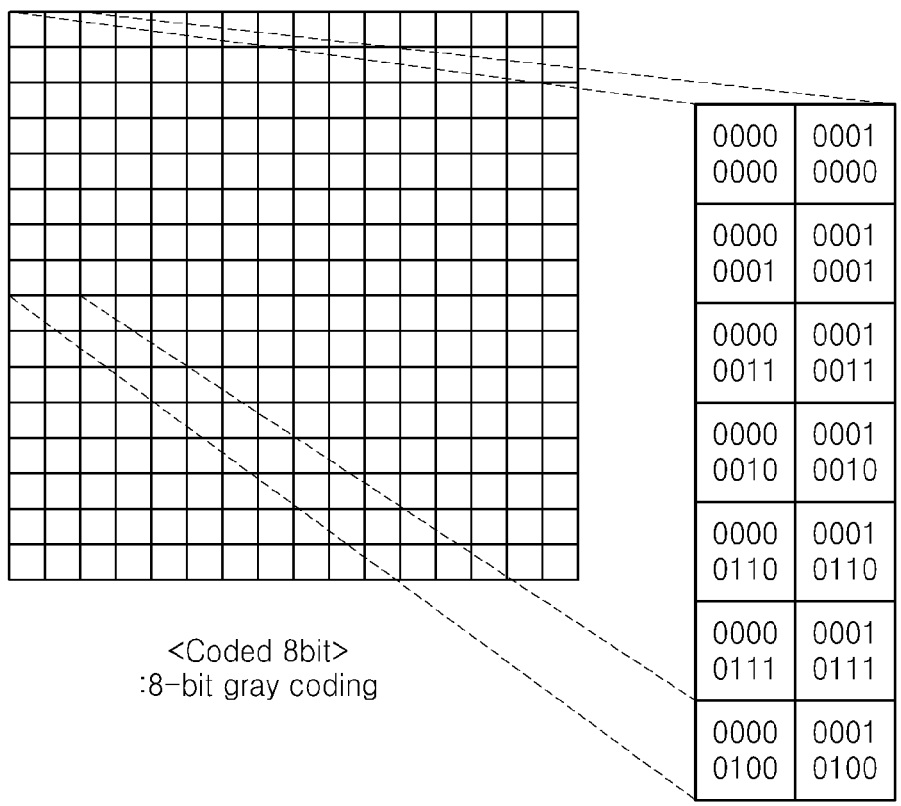
FIG. 7 is a diagram showing a method by which the mapper maps bit values in a constellation corresponding to high-frequency carrier signals according to an exemplary embodiment.
Figure 8:
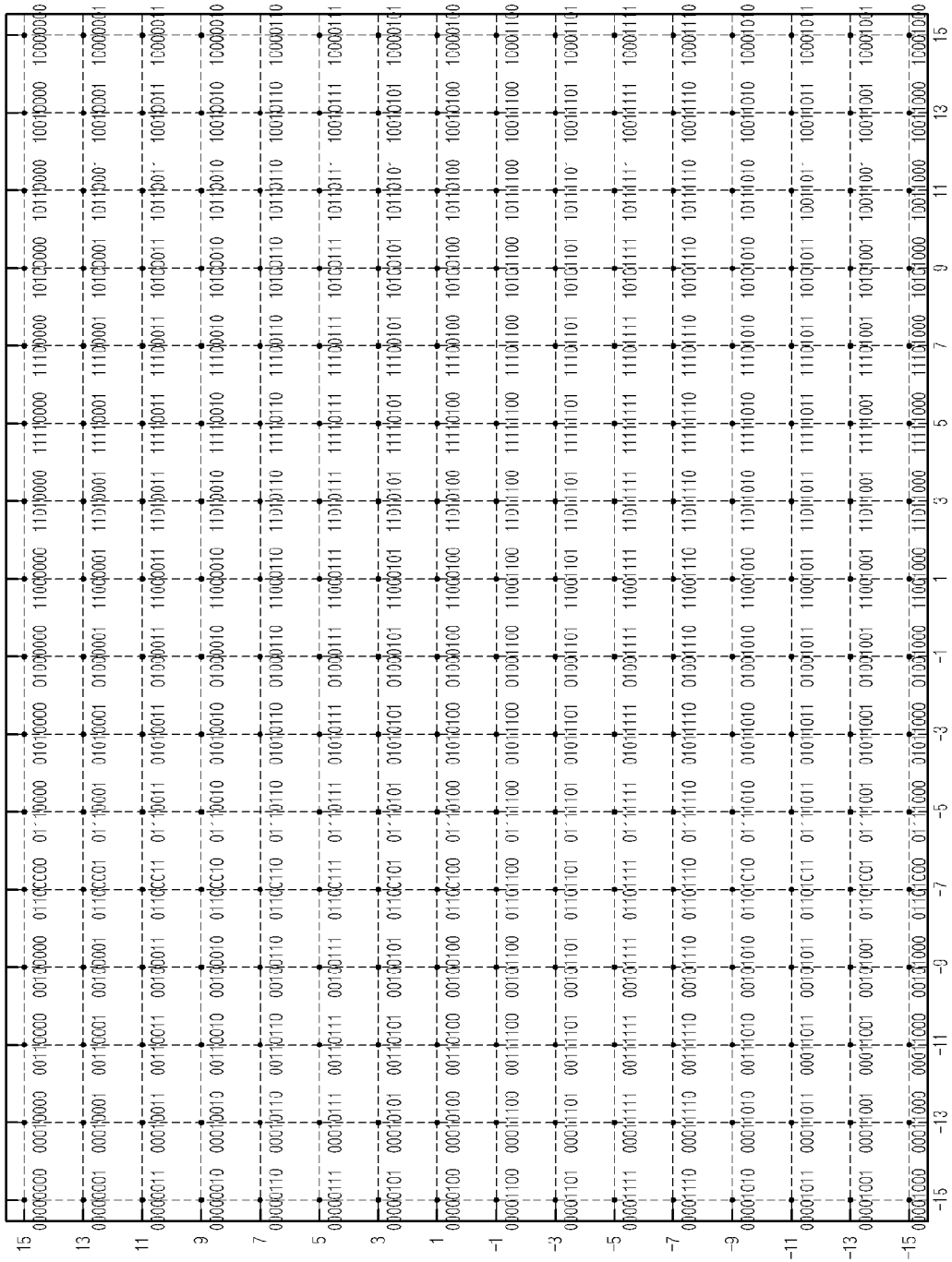
FIG. 8 is a diagram showing a constellation mapped using the method shown in FIG. 7.

FIG. 7 is a diagram showing a method by which the mapper 130 according to an exemplary embodiment maps bit values in a constellation corresponding to high-frequency carrier signals, and FIG. 8 is a diagram showing a constellation mapped using the method shown in FIG. 7.

The mapper 130 may map all the bit values corresponding to each of the symbols in a constellation corresponding to high-frequency carrier signals to each other via gray coding. Therefore, as shown in FIGS. 7 and 8, all the bit values corresponding to a symbol may have only one bit different from all the bit values corresponding to an adjacent symbol Hereinafter, referring to FIG. 9, a QAM symbol mapping method according to an exemplary embodiment will now be described.

Figure 9:
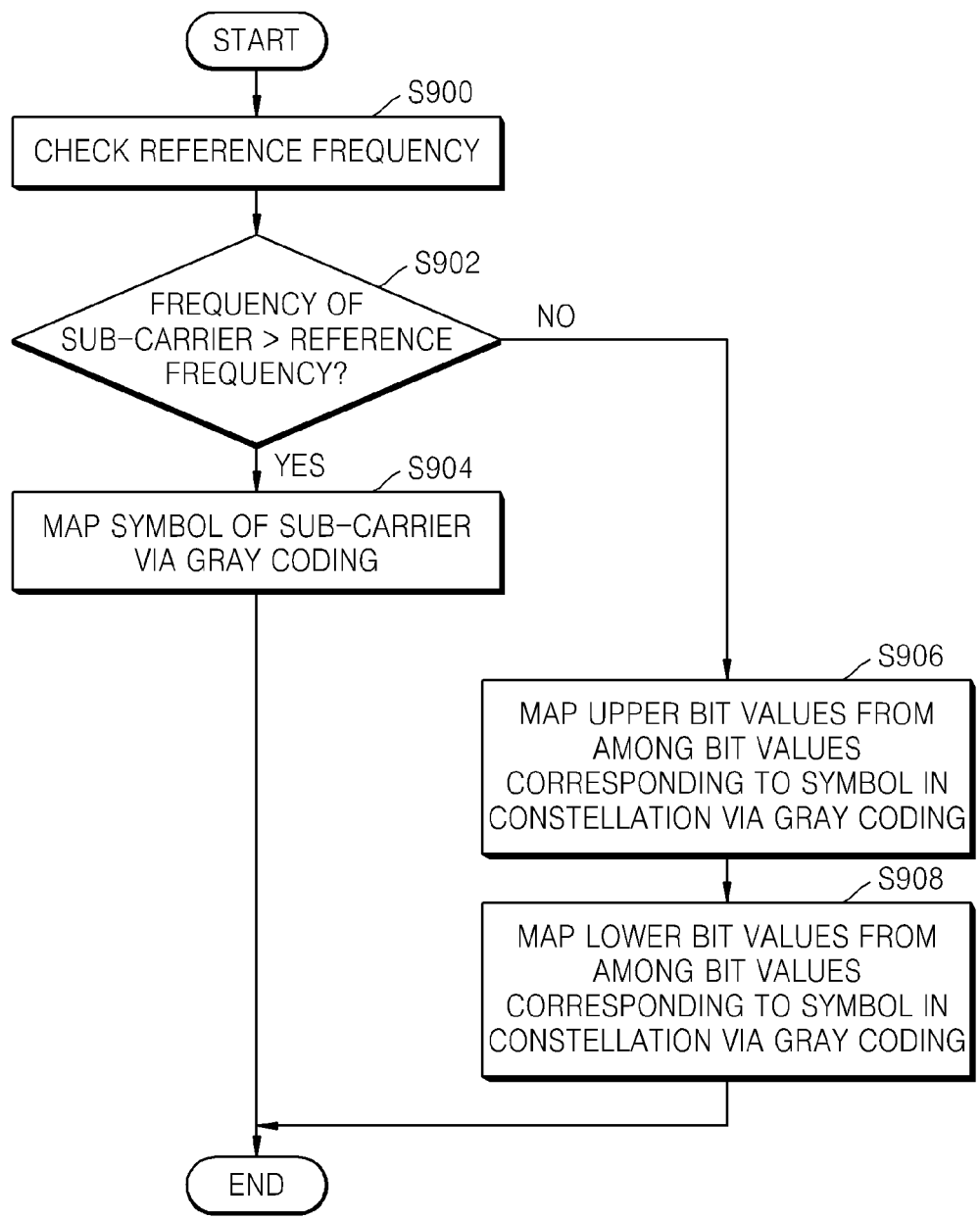
FIG. 9 is a flowchart showing a QAM symbol mapping method according to an exemplary embodiment.

FIG. 9 is a flowchart showing a QAM symbol mapping method according to an exemplary embodiment.

In an operation S900, the reference frequency is checked. In the operation S900, the QAM symbol mapping apparatus 100 may check the reference frequency to determine whether sub-carriers in an OFDM symbol are high-frequency sub-carriers or low-frequency sub-carriers. The reference frequency may be determined based on the degrees of reduction of intensities of signals of sub-carriers in an OFDM symbol during transmission via the wired cable 300. Furthermore, the reference frequency may be determined based on at least one of the length and type of the wired cable 300.

In an operation S902, it is determined whether a frequency of a sub-carrier is higher than the reference frequency. In the operation S902, the QAM symbol mapping apparatus 100 may determine whether each of the sub-carriers in an OFDM symbol is a high-frequency carrier signal or a low-frequency carrier signal based on the reference frequency.

As a result of the determination in the operation S902, if a frequency of a sub-carrier is higher than the reference frequency, the method proceeds to an operation S904.

In the operation S904, a symbol in a constellation that corresponds to a sub-carrier is mapped via gray coding. In the operation S904, the QAM symbol mapping apparatus 100 may map all the bit values corresponding to each of the symbols in a constellation regarding the sub-carrier without categorization. For example, if 8-bit values correspond to each of the symbols in a constellation, the mapper 130 may map the 8-bit values to each other via gray coding.

Furthermore, as a result of the determination in the operation S902, otherwise, if a frequency of a sub-carrier is lower than the reference frequency, the method proceeds to an operation S906.

In the operation S906, upper bit values from among bit values corresponding to a symbol in a constellation are mapped via gray coding. In the operation S906, the QAM symbol mapping apparatus 100 may categorize bit values corresponding to each of the symbols in a constellation into upper bit values and lower bit values. Furthermore, if 8-bit values correspond to each of the symbols in a constellation, the QAM symbol mapping apparatus 100 may map upper 4-bit values to each other via gray coding.

In an operation S908, lower bit values from among bit values corresponding to a symbol in a constellation are mapped via gray coding. In the operation S906, the QAM symbol mapping apparatus 100 may categorize bit values corresponding to each of the symbols in a constellation corresponding into upper bit values and lower bit values. Furthermore, if 8-bit values correspond to each of the symbols in a constellation, the QAM symbol mapping apparatus 100 may map lower 4-bit values to each other via gray coding.

Hereinafter, referring to FIG. 10, a method of mapping data to carrier signals, according to an exemplary embodiment, will now be described.

FIG. 10 is a flowchart showing a method of mapping data to carrier signals, according to an exemplary embodiment.

In an operation S1000, the reference frequency is checked. In the operation S1000, the QAM symbol mapping apparatus 100 may check the reference frequency to determine whether sub-carriers in an OFDM symbol are high-frequency sub-carriers or low-frequency sub-carriers. The reference frequency may be determined based on the degrees of reduction of intensities of signals of sub-carriers in an OFDM symbol during transmission via the wired cable 300. Furthermore, the reference frequency may be determined based on at least one of the length and type of the wired cable 300.

In an operation S1002, data is categorized. In the operation S1002, the QAM symbol mapping apparatus 100 may categorize data to be transmitted to the device 200 into data coded for error correction and uncoded data. The data to be transmitted from the QAM symbol mapping apparatus 100 to the device 200 may be processed by inserting control bits, inserting various headers, and scrambling. Furthermore, the data to be transmitted from the QAM symbol mapping apparatus 100 to the device 200 may be coded for error correction. Furthermore, the data coded for error correction may be LDPC coded data, for example.

In an operation S1004, it is determined whether a frequency of a sub-carrier is higher than the reference frequency. In the operation S1004, the QAM symbol mapping apparatus 100 may determine whether each of the sub-carriers in an OFDM symbol is a high-frequency carrier signal or a low-frequency carrier signal based on the reference frequency.

As a result of the determination in the operation 1004, if a frequency of a sub-carrier is higher than the reference frequency, the method proceeds to an operation S1006, in which only coded data is mapped to the sub-carrier. In the operation S1006, the QAM symbol mapping apparatus 100 may map the coded data with respect to all the bit values corresponding to a symbol in a constellation.

As a result of the determination in the operation 1004, if a frequency of a sub-carrier is lower than the reference frequency, the method proceeds to an operation S1008, in which a combination of coded data and uncoded data is mapped to the sub-carrier. In operation S1008, the QAM symbol mapping apparatus 100 may map the uncoded data with respect to upper bit values from among all the bit values corresponding to a symbol in a constellation. Furthermore, the QAM symbol mapping apparatus 100 may map the coded data with respect to lower bit values from among all the bit values corresponding to a symbol in a constellation.

Therefore, based on magnitudes of frequencies, a plurality of sub-carriers in an OFDM symbol may be modulated based on a combination of coded data and uncoded data or only coded data.

According to the exemplary embodiments described above, a large amount of data may be safely provided via a wired cable with an extended length.

Furthermore, according to the exemplary embodiments described above, data coded for error correction and uncoded data may be combined and transmitted based on a frequency of a sub-carrier.

Furthermore, according to the exemplary embodiments described above, based on frequencies of sub-carriers, symbols in a constellation may be categorized and mapped for transmitting data coded for error correction and uncoded data.

While the application has been particularly shown and described with reference to exemplary embodiments thereof, it will be understood by those of ordinary skill in the art that various changes in form and details may be made therein without departing from the spirit and scope of the exemplary embodiments as defined by the following claims.

What is claimed is:

1. A quadrature amplitude modulation (QAM) symbol mapping apparatus comprising:
a frequency checker, which checks frequencies of sub-carriers in an orthogonal frequency division multiplexing (OFDM) symbol; and
a data categorizer, which maps data coded for error correction and uncoded data to the sub-carriers based on the checked frequencies,
wherein the data categorizer maps the uncoded data with respect to sub-carriers having frequencies lower than a reference frequency.

2. The QAM symbol mapping apparatus of claim 1, wherein the data categorizer combines the coded data and the uncoded data and maps the combination with respect to the sub-carriers having frequencies lower than the reference frequency.

3. The QAM symbol mapping apparatus of claim 1, wherein the data categorizer maps only the coded data with respect to sub-carriers having frequencies higher than the reference frequency.

4. The QAM symbol mapping apparatus of claim 1, further comprising a mapper, which maps bit values to symbols included in a constellation corresponding to the sub-carriers,
wherein the coded data and the uncoded data are transmitted via the sub-carriers based on the bit values mapped to the symbols included in a constellation corresponding to the sub-carriers.

5. The QAM symbol mapping apparatus of claim 4, wherein, from among the bit values corresponding to symbols in a constellation corresponding to sub-carriers having frequencies lower than the reference frequency, the mapper maps upper bit values to the uncoded data and maps lower bit values to the coded data.

6. The QAM symbol mapping apparatus of claim 5, wherein, in the constellation corresponding to the sub-carriers having frequencies lower than the reference frequency, upper bit values in bits corresponding to the symbols are gray coded with respect to each other and lower bit values in bits corresponding to the symbols are gray coded with respect to each other.

7. The QAM symbol mapping apparatus of claim 5, wherein, in a constellation corresponding to the sub-carriers having frequencies lower than the reference frequency, all the bit values corresponding to a symbol are mapped via gray-coding.

8. The QAM symbol mapping apparatus of claim 1, wherein the coding for error correction is low density parity check (LDPC) coding.

9. The QAM symbol mapping apparatus of claim 1, wherein the reference frequency is determined based on degrees of reduction of intensities of signals of sub-carriers in the OFDM symbol during transmission via a wired cable.

10. The QAM symbol mapping apparatus of claim 1, wherein the reference frequency is determined based on at least one of a length and a type of wired cable.

11. A quadrature amplitude modulation (QAM) symbol mapping method comprising:
checking frequencies of sub-carriers in an orthogonal frequency division multiplexing (OFDM) symbol; and
mapping data coded for error correction and uncoded data to the sub-carriers based on the checked frequencies,
wherein, in the step of mapping data, when a frequency of a sub-carrier signal is lower than a reference frequency, bit values corresponding to the OFDM symbol are categorized into a plurality of bit values, and
wherein data to be transmitted is mapped to the categorized bit values.

12. The QAM symbol mapping method of claim 11, wherein, in the step of mapping data, when the frequency of the sub-carrier signal is lower than the reference frequency, coded data and uncoded data are combined and mapped to the bit values corresponding to the OFDM symbol.

13. The QAM symbol mapping method of claim 12, wherein, in the step of mapping data, when the frequency of the sub-carrier signal is lower than the reference frequency, upper bit values from among the bit values corresponding to the OFDM symbol are mapped to data coded for error correction, and
lower bit values from among the bit values corresponding to the OFDM symbol are mapped to uncoded data.

14. The QAM symbol mapping method of claim 11, wherein, in the step of mapping data, when the frequency of the sub-carrier signal is lower than the reference frequency, bit values corresponding to the OFDM symbol are categorized into upper bit values and lower bit values.

15. The QAM symbol mapping method of claim 14, wherein the upper bit values and the lower bit values are individually mapped in a constellation via gray coding.

16. The QAM symbol mapping method of claim 11, wherein the reference frequency is determined based on degrees of reduction of intensities of signals of sub-carriers in the OFDM symbol during transmission via a wired cable.

17. The QAM symbol mapping method of claim 11, wherein the reference frequency is determined based on at least one of a length and a type of wired cable.

18. The QAM symbol mapping method of claim 12, wherein the coding for error correction is low density parity check (LDPC) coding.

19. A quadrature amplitude modulation (QAM) symbol mapping method comprising:
checking frequencies of sub-carriers in an orthogonal frequency division multiplexing (OFDM) symbol;
comparing the checked frequencies to a reference frequency; and
mapping symbols in a constellation with respect to the sub-carriers based on a result of the comparison,
wherein, in the step of mapping the symbols in the constellation, when a frequency of the sub-carrier signal is lower than the reference frequency, bit values corresponding to the OFDM symbol are categorized into a plurality of bit values, and
the categorized bit values are individually mapped.

20. The QAM symbol mapping method of claim 19, wherein the bit values corresponding to the OFDM symbol are categorized into upper bit values and lower bit values,
the upper bit values are gray coded with respect to each other, and
the lower bit values are gray coded with respect to each other.

21. The QAM symbol mapping method of claim 20, wherein the upper bit values correspond to uncoded data, and
the lower bit values correspond to data coded for error correction.

22. The QAM symbol mapping method of claim 19, wherein, in the step of mapping the symbols in the constellation, when a frequency of a sub-carrier signal is higher than the reference frequency, all the bit values corresponding to the symbol are mapped to each other.

23. The QAM symbol mapping method of claim 22, wherein, when a frequency of the sub-carrier signal is higher than the reference frequency, the mapped symbols correspond to data coded for error correction.

24. A quadrature amplitude modulator (QAM) symbol mapping apparatus, comprising:
a reference frequency checker which determines whether a frequency in a sub-carrier in an orthogonal frequency division multiplexing (OFDM) symbol is higher than a reference frequency;
a data categorizer which categorizes data into data coded for error correction and uncoded data; and
a mapper which maps bit values to symbols included in a constellation corresponding to the sub-carrier,
wherein when the frequency of the sub-carrier in the OFDM symbol is lower than the reference frequency, the data categorizer combines coded data and uncoded data and maps the combined data to the sub-carrier, and
when the frequency of the sub-carrier in the OFDM symbol is higher than the reference frequency, the data categorizer maps only coded data to the sub-carrier.

25. The (QAM) symbol mapping apparatus of claim 24, wherein the reference frequency is determined based on degrees of reduction of intensities of signals of sub-carriers in the OFDM symbol during transmission.

* * * * *